April 19, 1960  A. K. ANANDER  2,933,014
VACUUM BOARD FILM SUPPORT FOR PHOTOMECHANICAL CAMERA
Filed May 7, 1959  2 Sheets-Sheet 1
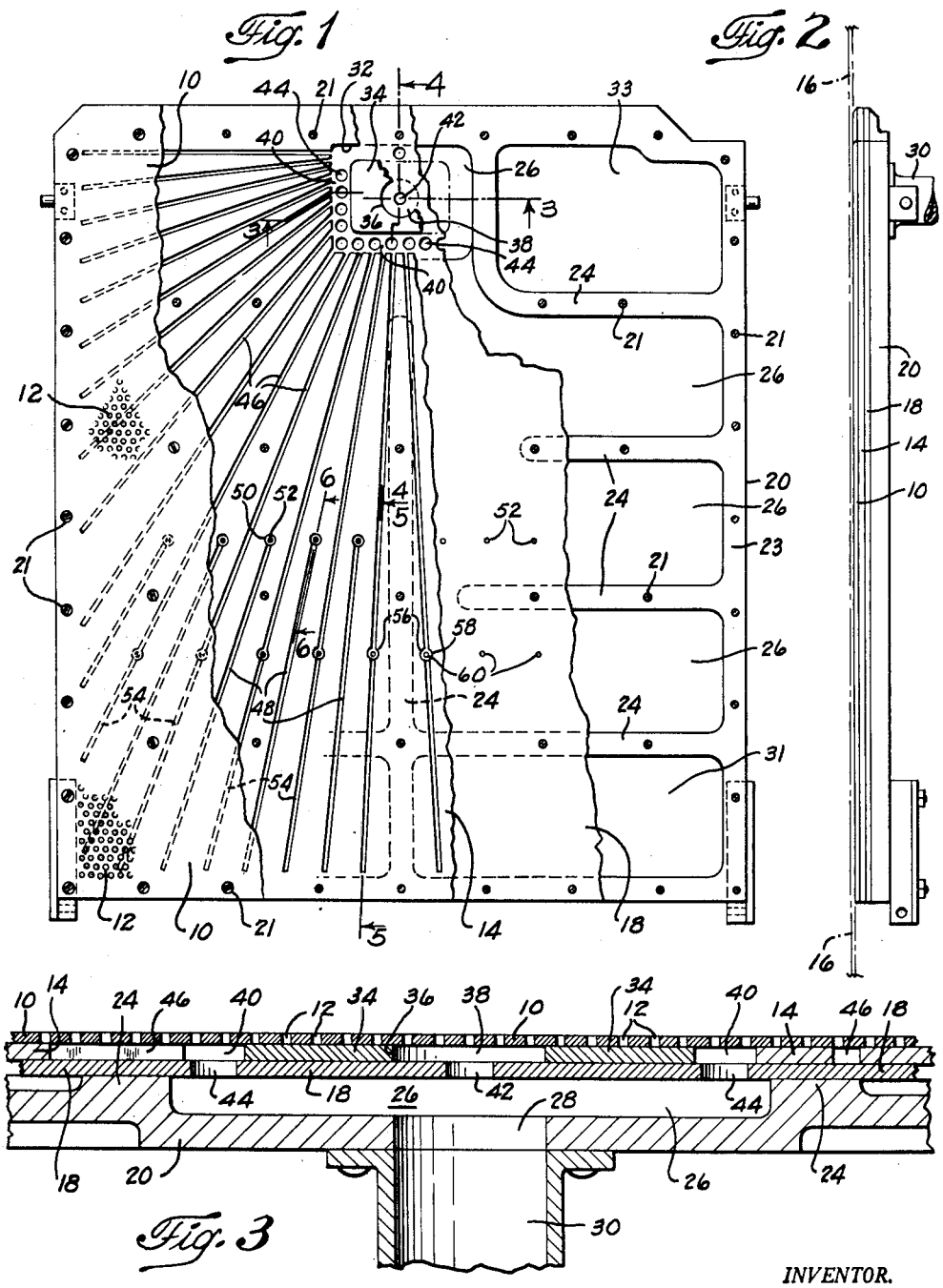
INVENTOR.
ANDREW K. ANANDER
BY
Morgan, Finnegan, Durham & Pine
ATTORNEYS.

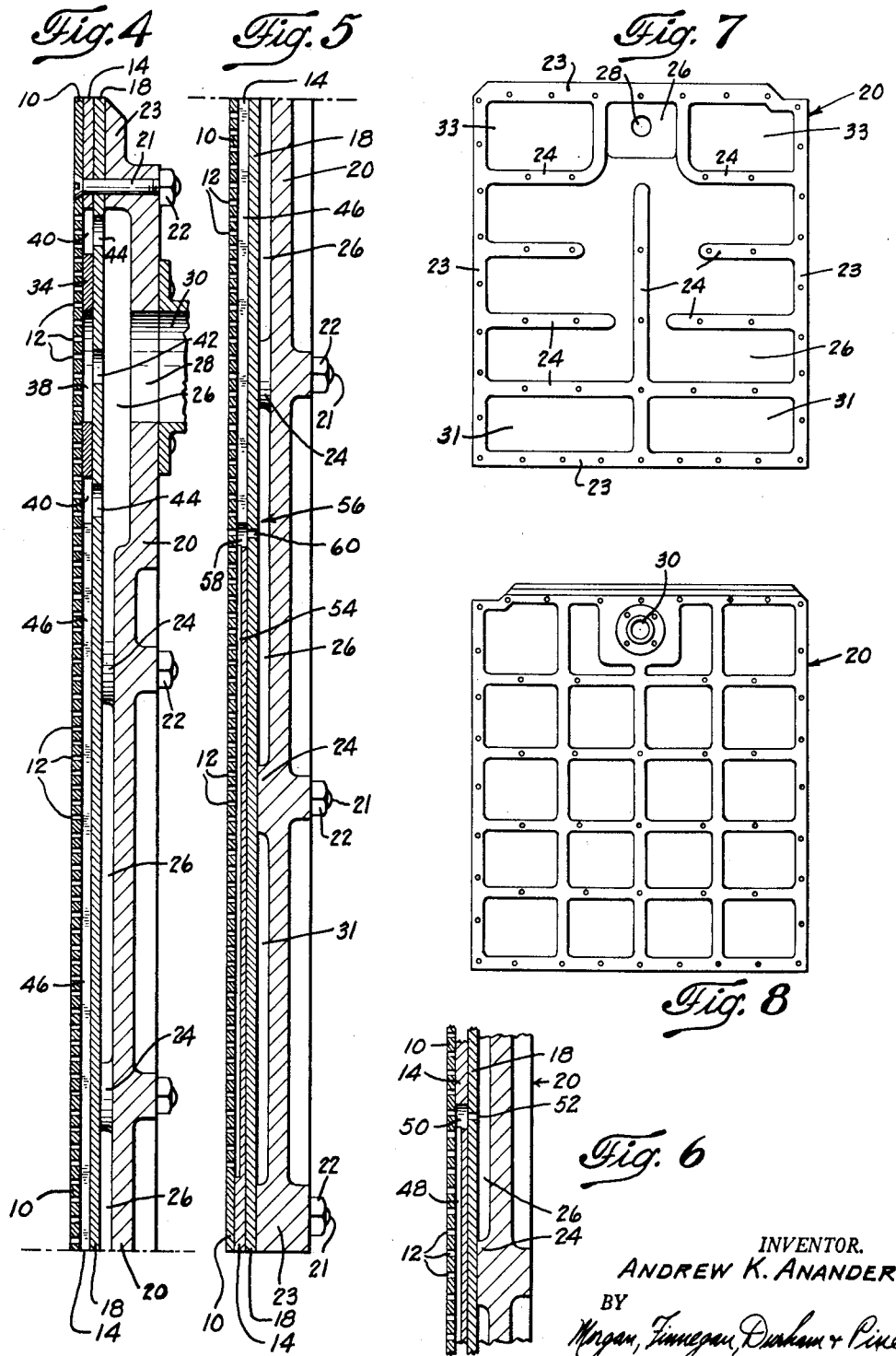

United States Patent Office 2,933,014
Patented Apr. 19, 1960

2,933,014

VACUUM BOARD FILM SUPPORT FOR PHOTO-MECHANICAL CAMERA

Andrew K. Anander, Glen Cove, N.Y., assignor to Powers Chemco, Inc., Glen Cove, N.Y., a corporation of New York Application May 7, 1959, Serial No. 811,712

3 Claims. (Cl. 88—24)

This invention relates generally to film supports as employed in photomechanical cameras for supporting the film sheet in the focal plane of the camera during exposure with the invention having specific relation to an improved vacuum type of support or board wherein the film sheet is retained in position for exposure by means of suction.

Objects and advantages of the invention will be obvious herefrom, or may be learned by practice with the invention, the same being realized and attained by means of the instrumentalities and combinations pointed out in the appended claims.

The present invention has for an object an improved vacuum film support or board which may be used with various sizes of film sheets and which tends to insure that the film will lie flat and be free of wrinkles for exposure in the focal plane of the camera. A further object is to provide such an improved vacuum board wherein the suction effect is greatest at the upper central portion of the board and progressively decreases outwardly from this location so that the film sheet tends to be smoothly drawn and held in engagement with the face of the board from this location outwardly, thereby reducing the possibility of wrinkling of the film sheet. Still another object is to provide such an improved vacuum board which does not have any moving parts such as flow operated valves and yet which does not have an excessive suction loss when the film sheet does not cover the entire area of the face of the board and with the amount of suction loss varying only slightly as the size of the film sheet is decreased. A still further object is to provide such an improved vacuum board wherein the amount of suction applied to the film sheet at the upper central portion of the board is not substantially affected as a result of suction loss due to the film sheet covering less than the full area of the face of the board. A further object is to provide such an improved vacuum board which while having a relatively low suction loss and providing a smooth overlay of the film on the face of the board is extremely simple in construction and trouble free in operation.

In accordance with the invention the vacuum board is of laminated construction, being comprised of a face plate, a pair of intermediate plates and a ribbed rear plate structure assembled in operative relationship. The face plate is provided with relatively closely spaced openings throughout its area with the exception of a relatively narrow peripherial rim and the rear plate structure, in cooperation with the rearmost intermediate plate, forms a manifold to which suction is applied by being connected to a suitable suction source. At the upper central portion of the board, the intermediate plates, in cooperation with the face plate, form a pair of concentric separate chambers, each of which communicates with the manifold and each of which overlays the rear face of the face plate. Radiating outwardly from the outermost of these chambers and extending almost to the edge of the vacuum board are a large number of relatively closely spaced channels which have a very small transverse section and which are open throughout their length to the rear face of the face plate. At the lower region of the vacuum board there are provided additional channels intermediate the channels extending from the outer of said chambers with these additional channels likewise being open to the rear face of the face plate and communicating at their upper ends with the manifold at the rear of the board. The area through which the outer of the chambers communicates with the manifold is generally equal to the total transverse area of the channels extending from this chamber and as a result of this somewhat restricted communication together with the resistance to air flow resulting from having the channels of a relatively small transverse or flow area the amount of suction that is lost because of the film sheet covering less than the total area or face of the board is not unduly great and does not cause a large reduction in suction or increase in pressure in the manifold.

Since the chambers at the upper portion of the board are separate the innermost chamber retains a high degree of suction, being substantially unaffected by any suction loss occurring at the extremities of the channels extending beyond the edge of a film sheet and accordingly insuring an adequate support for the film sheet at its upper central location. With this arrangement it will be appreciated that when a sheet of film is initially placed over the face of the vacuum board the suction effect will be greatest at the upper central portion and accordingly will immediately draw this portion of the film into engagement with the face of the board and since the suction effect along the radiating channels progressively decreases generally throughout the length of the channel toward their outer ends the film sheet will tend to be progressively brought into engagement with the face of the board from this upper central location outwardly thereby tending to insure a flat overlay of the film on the face of the board.

The invention consists in the novel parts, constructions, arrangements, combinations and improvements herein shown and described.

The accompanying drawings, referred to herein and constituting a part hereof, illustrate one embodiment of the invention and together with the description, serve to explain the principles of the invention.

Figure 1 is a front view of the improved vacuum board of the present invention with this view being broken away in order to show the details of construction of the laminated board;

Figure 2 is a side view of the improved vacuum board;

Figure 3 is an enlarged fragmentary transverse sectional view of the upper central portion of the vacuum board with this view being taken generally along line 3—3 of Figure 1;

Figure 4 is a fragmentary, generally vertical section taken along line 4—4 of Figure 1;

Figure 5 is a fragmentary generally vertical section in the same plane as Figure 4 but showing the lower portion of the vacuum board and being taken along line 5—5 of Figure 1;

Figure 6 is a fragmentary sectional view taken generally along line 6—6 of Figure 1;

Figure 7 is a vertical elevational view of the front of the back plate structure that forms a part of the vacuum board of the invention, and;

Figure 8 is a vertical elevational view of the back or rear face of this back plate structure.

Referring now to the drawings, wherein like reference characters are used throughout to designate like elements, the illustrative and preferred embodiment of the invention depicted therein includes a vertically disposed face plate 10 which is provided throughout all but the outermost portion of its area with closely spaced small diameter openings 12 and over the front face of the plate is received the film sheet 16. To the rear of face plate 10 are retained plates 14 and 18, respectively, with plate 14 overlaying the rear face of face plate 10 and plate 18 overlaying the rear face of plate 14. The back of the vacuum board is made up of the plate structure 20, which, as explained hereinafter, provides a suction distribution manifold. This laminated assembly is secured together in operative relationship by means of the machine screws 21 which are received within suitable aligned bores in the several plates disposed about the periphery of the vacuum board as well as at scattered locations over the area of the board with these screws being countersunk into the face plate 10 and having nut 22 threadedly received on their end that extends from back plate 20.

The suction distribution manifold is formed at the rear portion of the board by providing back plate 20 with a forwardly extending peripheral region 23, as shown in Figures 4 and 5, as well as forwardly extending ribs 24. This peripherial portion and these ribs engage the rear face or surface of plate 18 in a generally fluid tight manner and thereby form the manifold 26 which communicates with a suitable source of suction through the opening 28 and conduit 30. Ribs 24 enable the laminated vacuum board to be secured together by machine screws 21 at scattered locations throughout the area of the board and in addition these ribs add rigidity to the backing plate 20. It will be noted that the compartments 31 formed by the ribs and the forwardly extending peripherial portion 23 at the lower end of the board and the chamber 33 similarly formed at the upper end of the board do not form part of the suction manifold since, as will be brought out hereinafter, there is no need for these chambers to be opened to or from part of the manifold.

As embodied, plate 14 which overlays the rear face of face plate 10 has a large generally rectangular opening 32 provided in its upper central portion or region and within this opening 32 is positioned a similarly shaped but smaller plate 34 with this latter plate having circular opening 36 provided therein. Plate 34 is the same thickness as plate 14 and each of these plates engage the rear face of face plate 10 and the front face of plate 18 in a generally fluid tight manner. Accordingly, by means of positioning plate 34 within the opening 32 in plate 14 there is provided or formed two separate generally concentric chambers 38 and 40 which are open to the rear face of face plate 10. Chamber 38 is in communication with manifold 26 through opening 42 in plate 18 while chamber 40, which is endless and in the nature of an annular chamber, communicates with the manifold through openings 44 also provided in plate 18.

Radiating outward from chamber 40 are the channels or grooves 46, as shown in Figure 1, with these channels being formed by suitably slotting plate 14 and with the chanels being open on one side to the rear face of face plate 10 so that the openings 12 that communicate or open into a particular channel may have suction applied through them by means of the channel, which is in communication with the suction manifold.

Since the channels 46 that extend to the lower region of the vacuum board are considerably longer than those extending out to the sides, in order to have adequate suction at the lower region of the board there is provided at this region additional channels 48 intermediate the channels 46. The upper end of these additional channels 48 terminate in an opening 50 which communicates with manifold 26 through the restricted opening 52 provided in plate 18 (Fig. 6). The additional channels 48 have a transverse section which is only about half that of the channels 46 radiating from chamber 40 and the portion or section of these channels 46 radiating from chamber 40 which corresponds with and is intermediate the additional channels 48, this portion being identified as 54 in Figure 1, also has a transverse section that is about half that of the remaining portion of these channels and the other channels radiating from chamber 40. With this arrangement the addition of channels 48 does not increase the total transverse area of the channels and accordingly does not increase the suction loss although providing for a greater distribution of suction. It is found that it is neither necessary nor desirable to extend additional channels 48 upward beyond the location shown. They are needed in the lower region because with channels 46 radiating from a location at the upper center portion of the vacuum board the length of the channels 46 and particularly the spacing of these channels necessitates the additional channels 48 in order to assure a flat overlay of film strip 16.

Since the channels radiating from chamber 40 are of very restricted transverse section the pressure drop along the length of these channels which will prevail when the film sheet does not extend throughout the length of the channel is relatively large and it has been found desirable to have the relatively long channels that extend from chamber 40 to the lower portion of the board communicate with the suction manifold at their lower region as well as communicating with the manifold through the chamber 40 and openings 44. For this reason at the locations identified at 56 in Figure 1 each of the channels intercepts a bore 58 provided in plate 14 and communicates with the manifold through the restricted passage 60 in plate 18 (Fig. 5).

With the vacuum board of the invention, when a film sheet is placed on the face of the board with the sheet having an area less than that of the face of the board the portion of the channels 46 and the channels 48 which extend beyond the edge of the film sheet will be open to atmosphere through the openings 12 which communicate with these channel portions. However, the total effective area that is open to atmosphere is only the total cross sectional area of the channels since with chambers 38 and 40 covered this is the maximum area communicating with manifold 26 that can be open to atmosphere. Since these channels act as flow restrictors with the flow resistance increasing with the effective length of the channel underlying the film sheet the suction loss will not be unduly great as a result of the channels extending beyond the edge of a particular sheet of film and will vary only slightly with variations in the film sheet size. The suction loss will not be extremely great even if the film sheet does not extend down to the location 56 or even if the film sheet does not extend down to the upper end of the additional channels 48 since both the openings 60 and 52 which communicate with the manifold at these respective regions or locations are of a very restricted area. The total area of openings 44 is generally equal to the total area of channels 46 radiating from chamber 40 and while chamber 40 has a substantially greater area than the channels these openings 44 act somewhat as flow restrictors tending to lessen suction loss. All this results in a relatively low loss of suction and the vacuum produced in manifold 26 is not unduly dissipated as a result of the film sheet covering less than the full face of the board and accordingly the channels 46 extending beyond the edge of the film sheet.

In a typical arrangement or vacuum board that embodies the present invention the board may have overall dimensions of 26" in height and 23" wide. The holes in the face plate, which may be a phenolic sheet, may be .086" in diameter positioned on $\%_4$" centers. The channels radiating from chamber 40 may be $\frac{1}{8}$" square with the portion of the channels that extend to the lower region of the board, which portion is identified as 54, and the additional channels 48 being $\frac{1}{8}$" wide and $\frac{1}{16}$" deep. Opening 28 which communicates with the vacuum source may be 1¼" in diameter and opening 36 in plate 34 may be also 1¼" in diameter while the openings 42 and 44 may be $\frac{3}{8}$" in diameter, with the total area of openings 44 being substantially equal to the total cross sectional area of the channels 46 communicating with and radiating from chamber 40. Openings 52 and 62 are .113" in diameter.

When a sheet of film is placed on the face of the vertically arranged vacuum board the relative high suction in chamber 38 as well as the suction in chamber 40, which although not as high as that in chamber 38 is greater than that prevailing over the rest of the vacuum board, causes the film to first be drawn into engagement with the face of the board at the upper central location of the board and the film. Since suction is applied to the radiating channels 46 through chamber 40 the effective suction along these channels decreases outwardly from this chamber 40. Therefore the film sheet will tend to progressively be drawn into engagement with the face of the board outwardly from the upper central location of the board and the film tending to insure against the formation of wrinkles and to provide a flat smooth overlay of the film on the face of the vacuum board. Once the film sheet is drawn into engagement with the face of the film support the greatest amount of pressure forcing the film sheet against the face of the support continues to be applied at the upper central portion of the board with the amount of pressure decreasing outward from this upper central portion even when the film sheet covers the entire face of the support with this resulting from the large area of chambers 38 and 40 and from radiating disposition of the restricted channels. Furthermore, when the channels extend beyond the effective area or edge of the film sheet the amount of suction in the channels progressively decreases outwardly of chamber 40. Thus the film sheet tends to hang from the upper central portion which tends to prevent the formation of a wrinkle or bulge in the film during exposure. Since the film sheets are relatively heavy, it is advantageous to support them in this manner so that they are more or less hung from their upper ends.

In order to have these advantageous results it is essential to have the two separate chambers 38 and 40 located at the upper central portion of the board as shown and to have them independent of each other and independently connected with the suction manifold. It is also necessary to have the radiating channels as shown so the suction effect will decrease outwardly from the upper central portion of the board. There cannot be other locations on the board which have a suction equal to or greater than that at the upper central portion of the board since this will prevent the smooth progressive overlay of the film sheet mentioned hereinbefore.

Accordingly, with the present invention an extremely simple vacuum board is provided which may be readily used for any size of film sheet within the area of the board, which does not have an excessive suction loss and which tends to insure against wrinkling of the film in being applied to the board as well as during exposure.

The invention in its broader aspects is not limited to the specific mechanism shown and described but departures may be made therefrom, within the scope of the accompanying claims, without departing from the principles of the invention and without sacrificing its chief advantages.

What is claimed is:

1. An upright vacuum board for a photomechanical camera comprising a face plate having closely spaced openings disbtributed over its area, a back plate structure forming a manifold extending over a substantial area of the board and to which suction is applied, and intermediate plate means overlying the back of the face plate and providing a first chamber at the upper central region of the board open to the back of the face plate and communicating with the manifold and a second chamber at said upper central region separate from and disposed about said first chamber, said second chamber being open to the back of the face plate and having a restricted communication with said manifold, said plate means providing channels radiating outward from said second chamber to the outer region of the board and open to the back of said face plate, the restricted communication of said second chamber with the manifold being generally equal to the total transverse area of said channels extending from the chamber, additional channels intermediate these channels at the lower region of the board and each communicating at their upper end with said manifold through a restricted passage, each of said additional channels and the portion of each of the first mentioned channels corresponding therewith having a transverse area about half that of the remaining portion of the first mentioned channels.

2. A vacuum board for supporting sheet material in a vertical position in a camera comprising a generally vertical face plate having openings distributed over its surface, means for supporting a sheet of material on the front face of said plate solely by the application of suction through the openings over a substantial area of the face at the upper central portion thereof and through the openings at narrow locations directed radially of said upper central portion, intermediate plate means overlaying the back of the face plate and forming therewith a first chamber at the upper central region of the board and a second chamber at the same general region separate from the first and extending therebelow, relatively closely spaced channels communicating with and radiating from said second chamber and terminating in closely spaced relation with the edge of the board, additional channels confined to the lower region of the board and disposed intermediate the first mentioned channels, said additional channels and the portion of the first mentioned channels in the lower region of the board corresponding therewith having a transverse area about half that of the remaining portion of the first mentioned channels, the back of the face plate forming the front wall of said chambers and channels, a backing plate means disposed at the rear of the intermediate plate means and forming therewith a manifold extending over a substantial area of the board and to which suction is applied, said intermediate plate means having openings therein providing restricted communication of said second chamber with the manifold and separate communication of said first chamber with the manifold, said intermediate plate means also having restricted openings providing communication at the upper ends of said additional channels with the manifold and providing communication at the upper region of said portion of the first mentioned channels corresponding with said additional channels with the manifold.

3. A vertically disposed vacuum board comprising a face plate having closely spaced openings distributed over its area, a first intermediate plate overlying the back of said face plate and having a relative large opening in its upper central region, said intermediate plate having slots extending therethrough and radiating outward from said opening with slots extending toward the sides terminating in close relation thereto and those extending toward the bottom terminating well spaced therefrom, with grooves being provided in the face of said intermediate plate about half the depth thereof to form extensions of these last mentioned slots and terminating in close relation to the edge of the plate, additional and similar grooves provided in the face of said intermediate plate intermediate the first mentioned grooves, plate means of the same thickness as the intermediate plate, substantially smaller than said opening and disposed therein in spaced relation therewith with said plate means having a large relieved portion therein, a second intermediate plate overlying the back of said first intermediate plate whereby a pair of chambers are formed at the upper region of the board one within the other, said second intermediate plate having separate openings therein extending from the chambers with the area of the openings extending to the outer chamber being generally equal to the area of the slots communicating therewith, said second intermediate plate having restricted openings therein extending from the upper ends of said additional grooves, and a back plate disposed over the rear of the second intermediate plate and forming therewith a manifold with which the openings in the second intermediate plate communicate and which is adapted to be connected with a source of suction.

No references cited.